United States Patent [19]

Offutt

[11] 4,321,911
[45] Mar. 30, 1982

[54] MODULAR SOLAR COLLECTOR SYSTEM

[76] Inventor: Worthington W. Offutt, 1251 Verbena Dr., Palm Springs, Calif. 92262

[21] Appl. No.: 66,681

[22] Filed: Aug. 15, 1979

[51] Int. Cl.$^3$ ............................................. F24J 3/02
[52] U.S. Cl. .................................. 126/448; 126/426; 285/242; 285/255
[58] Field of Search ................... 126/447, 448, 426; 285/255, 242, 402; 165/175

[56] References Cited

U.S. PATENT DOCUMENTS

| | | | |
|---|---|---|---|
| 3,860,268 | 1/1975 | Zeman | 285/255 |
| 3,885,819 | 5/1975 | Egerer et al. | 285/255 |
| 3,893,507 | 7/1975 | MacCracken et al. | 165/175 |
| 3,997,195 | 12/1976 | Bartholomew | 285/382 |
| 4,039,212 | 8/1977 | Skarud | 285/347 |
| 4,060,070 | 11/1977 | Harter | 126/447 |
| 4,133,298 | 1/1979 | Hayama | 126/438 |
| 4,133,347 | 1/1979 | Mercer | 285/402 |

Primary Examiner—Carroll B. Dority, Jr.
Attorney, Agent, or Firm—Nicholas J. Aquilino

[57] ABSTRACT

A modular solar collector system formed of interconnectible manifold sections and a plurality of tubular collectors connected between the manifold sections having fittings and connecting means for securing the tubular collectors and forming a liquid tight seal.

5 Claims, 9 Drawing Figures

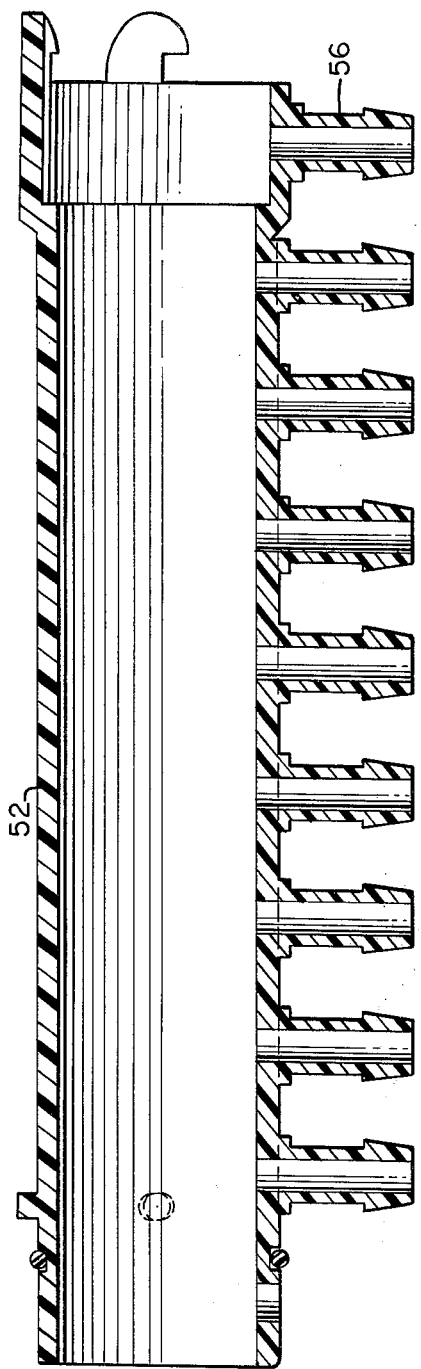
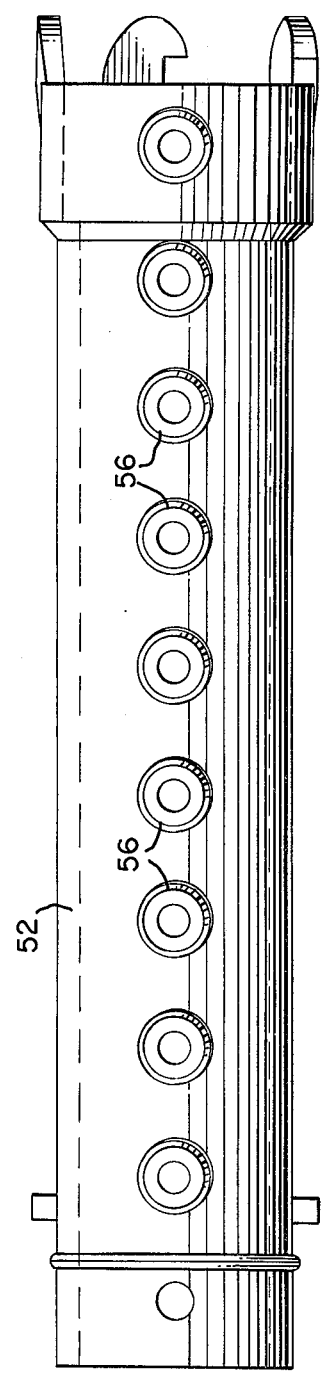
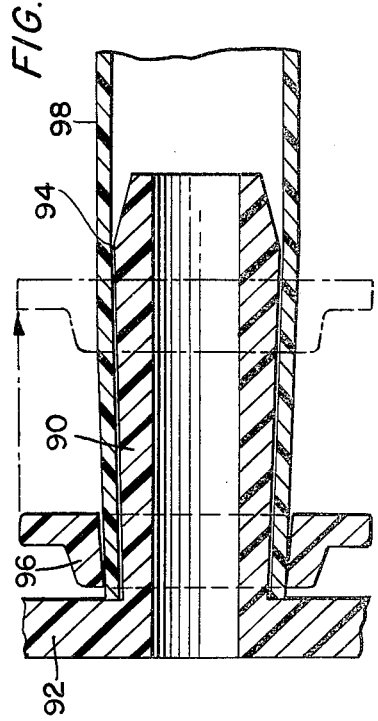
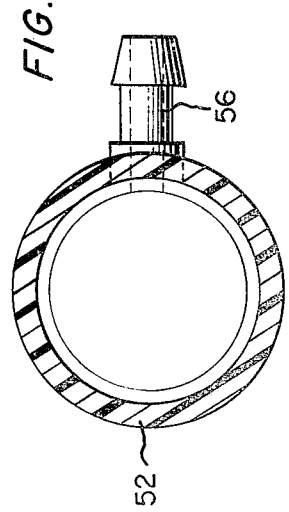

MODULAR SOLAR COLLECTOR SYSTEM

BACKGROUND OF THE INVENTION

The present invention relates to a modular solar energy system and, in particular, to the improved structural arrangement connecting the components of the system.

Because of the increased focus on energy limitations, particularly those using fossil fuels, emphasis has been placed on the use of solar heat as an alternative and less expensive source. One of the major shortcomings in the use of solar energy lies in the relatively expensive systems which are currently available needed to produce the solar energy compared to the actual amount of energy they produce. Attempts have been made to reduce the cost of solar collector installations, but heretofore, with relatively little success.

Prior patent art in this area is shown by the U.S. Pat. Nos. to Kelly (2,208,789), Gow et al (3,076,450), Mlavsky (3,976,508) Hojinowski (3,995,615), Pei (4,033,327) and Googan et al (4,048,980), among others.

The present invention relates to a leak-proof, quick connect, labor saving and efficient modular solar energy collector system. The system includes interlocking manifold sections which connect a plurality of tubular collectors. Locking rings are provided to form leak tight connection between the tubing and the manifold.

Among the objects of the present invention are the provisions of a modular solar energy collector system incorporating preformed units which are fit together in any desired configuration, in situ, providing easy assembly and reduced installation cost.

BRIEF DESCRIPTION OF THE DRAWINGS

FIG. 6 shows a sectional view of an element of the collector of FIG. 4.

FIG. 7 shows a side view of the element of FIG. 6.

FIG. 8 shows an end view of the element of FIG. 6.

FIG. 9 shows a sectional view of an alternate embodiment of a part of the solar collector of FIG. 4.

DESCRIPTION OF THE PREFERRED EMBODIMENTS

Figure 1:
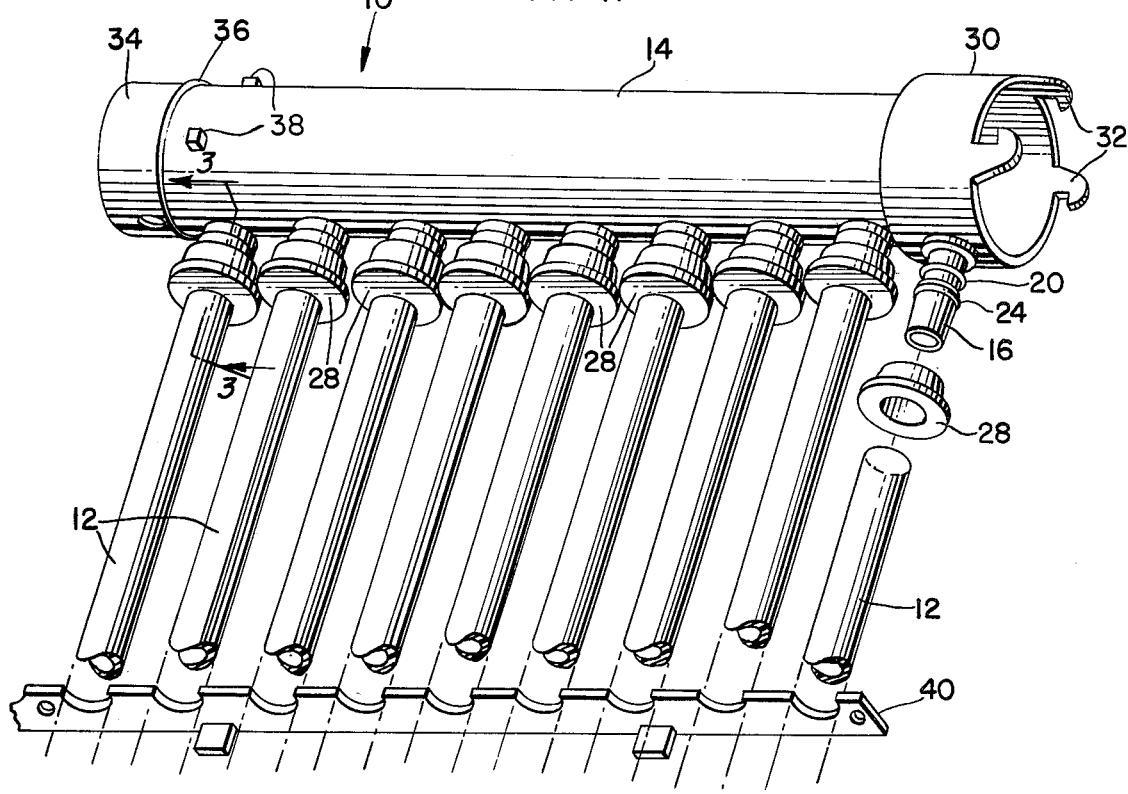
FIG. 1 shows a partial perspective view of the solar energy collector of the present invention.
Figure 2:
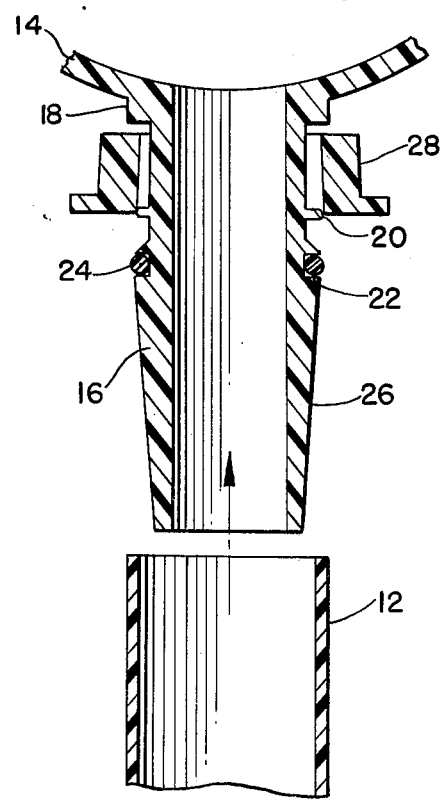
FIG. 2 shows an unassembled sectional view of part of the solar collector of FIG. 1.
Figure 3:
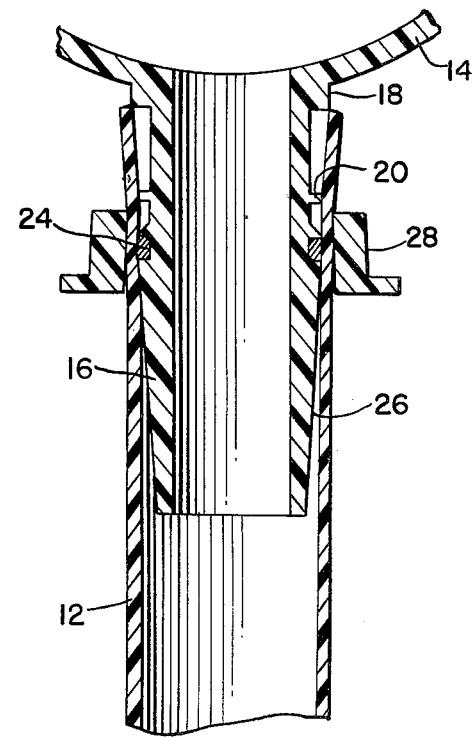
FIG. 3 shows an assembled sectional view of FIG. 2.

FIGS. 1, 2 and 3 illustrate a modular solar collector 10 of the present invention. A plurality of tubular collectors 12 are connected to a manifold section 14 by means of fittings in the form of a nipple 16 which projects outwardly from the manifold body as shown in the drawings. Each nipple 16 includes a shoulder 18 at the point where it is attached to the manifold. The nipple 16 also includes an annular rib 20 and an annular recess 22 which secures an O-ring 24. The outer portion 26 of the nipple 16 is tapered toward the forward end in order to receive the tubular collectors 12. When the tubular collectors 12 are assembled, the ends of the collectors are fit over the nipples 16 and are locked in place by a locking ferrule 28.

FIG. 2 illustrates a sectional view of the nipple 16 with a tubular collector 12 which is disengaged and the locking ferrule 28 in the unlocked position on the nipple. FIG. 3 illustrates the locking ferrule 28 in a locked position over a collector 12 on the nipple 16 where the ferrule 28 is centered over the O-ring 24 which is compressed by the inner wall of the tubular collector 12 and forms a liquid-tight connection at this point.

The female end 30 of the manifold 14 is provided with an increased diameter and includes locking hooks 32. The opposite male end 34 of the manifold 14 includes an O-ring 36 recessed in annular groove and a series of rectangular shaped locking lugs 38. In order to make a modular system, the male end 34 of a plurality of manifold sections 14 are fit into corresponding female ends 30 of adjacent manifold sections 14. The hooks 32 engage the lugs 38 to secure the arrangement. The O-ring 36 provides a liquid-tight seal at this point. A tubing spacer support 40 maintains the tubular collectors 12 in place.

It will be appreciated that any number of manifold sections and corresponding tubular collectors may be used to form a solar collector array. The parameters depend upon the particular location and design specifications needed. Once an array is set up, the module is then connected to conventional plumbing to complete the system.

Figure 4:
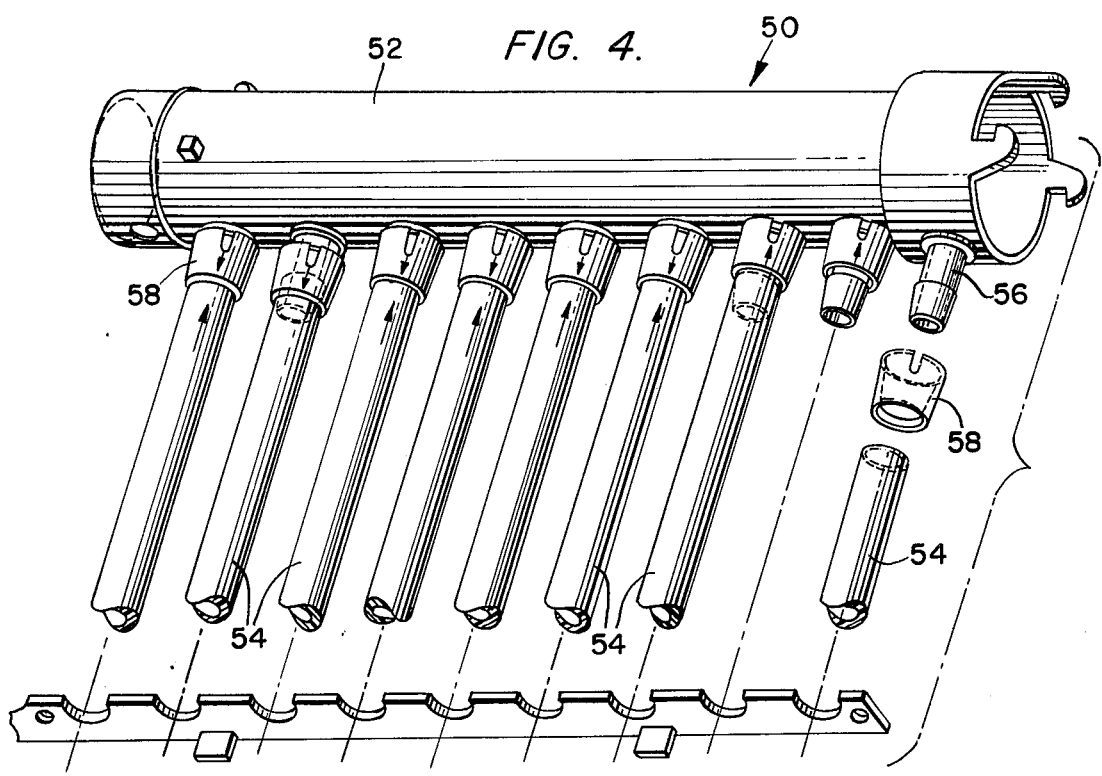
FIG. 4 shows a partial perspective view of a second embodiment of the solar collector of the present invention.
Figure 5:
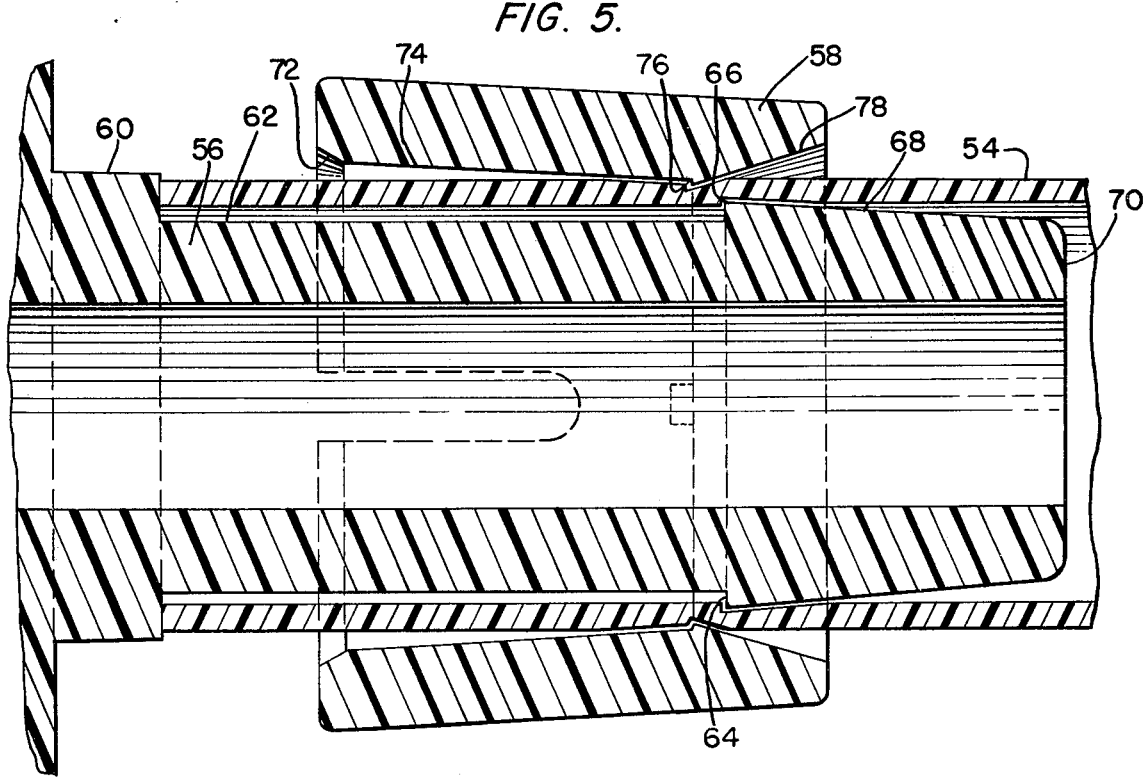
FIG. 5 shows a sectional view of part of the solar collector of FIG. 4.

FIG. 4 shows a modular solar collector 50 which include an alternate embodiment for interconnecting the manifold 52 with the tubular collectors 54. As shown in detail in FIG. 5, the collectors 54 are attached to a series of nipples 56 on the manifold 52 using a locking ferrule 58 to provide a liquid-tight connection. The nipple 56 includes a first shoulder 60 at the point where it is connected to the manifold body. Extending outwardly from the shoulder is a tubular section 62 of the nipple formed of a reduced diameter which terminates in an annular shoulder 64, the upper edge of which provides a peripheral sealing rim 66. The front tubular portion 68 of the nipple tapers gradually at an angle of 4° toward the front of the nipple. The extreme end 70 of the nipple is rounded to provide a smooth surfacae to receive the tubular collector 54. The locking ferrule 58 is an annular member which gradually tapers from a maximum diameter at the end nearest the manifold to a reduced diameter toward the front of the nipple 56. The inner surface of the locking ferrule 58 is formed with a flared opening 72 at the end adjacent the manifold 52. From the point, the inner surface 74 of the ferrule 58 tapers to a reduced diameter at an angle of 4° and terminates at an internal shoulder 76 which includes a peripheral sealing edge. The inner surface 78 between the shoulder 76 and the end of the ferrule 58 tapers outwardly at an angle of 15° which forms a sharp edge on the peripheral ceiling rim of the shoulder 76.

As seen in the drawings, when the tubular collector 54 is placed upon the nipple 56 and the locking ferrule 58 is pulled down toward the front of the nipple, the sealing rim 66 created by the shoulder 64 on the front of the nipple and the sealing rim created by the shoulder 76 on the locking ferrule both compress the tubular collector 54 surface at two points forming a double locking seal. This arrangement provides a liquid-tight connection between the manifold 52 and the collectors 54.

FIGS. 6, 7 and 8 show sectional, side and end views, respectively, of the manifold 52.

FIG. 9 shows a second alternate embodiment of the connection between the manifold section and the tubular collectors. A nipple 90 is connected to a manifold 92 and is formed of an elongated tubular section which gradually increases in diameter toward the front of the nipple away from the manifold. The front portion of the nipple tapers toward the front to a lesser diameter. At the intersection between the two tapering sections of the nipple 90, the sealing rim 94 is formed. A blocking ferrule 96 having an inside taper which is adapted to slide toward the front of the nipple 90, to engage a tubular collector 98 and secure it in place. The locking ferrule 96 forces the tubular collector 98 against the sealing rim 94 compressing it and forming a leak-proof seal.

It will be appreciated modification may be made in the above described embodiments without departing from the scope of the invention as defined in the following claims.

What is claimed is:

1. A modular solar collector system comprising a plurality of manifold sections, said manifold sections including male and female ends adapted to fit into each other; a plurality of tubular collectors connected between said manifold sections; connecting means for connecting said collectors to said manifold; said connecting means including fittings on said manifold sections adapted to receive said tubular collectors; and annular locking means adapted to fit over said fittings and said collectors when they are connected; said fittings having a nipple shape and including two exterior surfaces of different heights, the junction of which forms an annular shoulder perpendicularly disposed to the axis of said nipple, the edge of which forms a peripheral sealing ring, one of said surfaces tapering downwardly toward the front of said nipple, said annular locking means having two inner tapering surfaces disposed at different angles relative to an axis of said locking means, an annular shoulder formed at the junction of said two inner surfaces and perpendicularly disposed to the axis of said annular locking means, and having a peripheral rim, said peripheral sealing ring of said nipple cooperating with the inner surface of said tubular collector to form a seal when said annular locking means is in place, and said annular shoulder on said annular locking means cooperating with the outer surface of said tubular collector to form a pressure junction to compress said collector tubes at a location adjacent said seal to insure a tight connection at that point.

2. The solar collector of claim 1 wherein one of said tapering surfaces on said annular locking means is positioned directly over said sealing ring of said nipple.

3. The solar collector system of claim 1 wherein said inwardly tapering surface on said nipple tapers at an angle of approximately 5° and said other exterior surface is perpendicular to the axis of said manifold sections, and one of said tapering surfaces on said annular locking means tapers inwardly at an angle of approximately 5° and said second tapering surface tapers at an angle of approximately 15°.

4. The modular solar collector system of claim 1 wherein said manifold sections include a plurality of locking hooks and lugs to retain said sections together.

5. The system of claim 1 further including support member interconnecting and spacing said tubular collectors between said manifold sections.

* * * * *